(12) United States Patent
Kizumi et al.

(10) Patent No.: US 11,631,257 B2
(45) Date of Patent: Apr. 18, 2023

(54) SURROUNDINGS RECOGNITION DEVICE, AND SURROUNDINGS RECOGNITION METHOD

(71) Applicant: HONDA MOTOR CO., LTD., Tokyo (JP)

(72) Inventors: Yuki Kizumi, Wako (JP); Takashi Mine, Wako (JP); Keisuke Oka, Wako (JP); Masahiko Asakura, Wako (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 17/164,853

(22) Filed: Feb. 2, 2021

(65) Prior Publication Data

US 2021/0248391 A1 Aug. 12, 2021

(30) Foreign Application Priority Data

Feb. 6, 2020 (JP) .............................. JP2020-019193

(51) Int. Cl.
    *G06V 20/50* (2022.01)
    *G06V 20/56* (2022.01)
    *G06K 9/62* (2022.01)
    *G01C 21/00* (2006.01)

(52) U.S. Cl.
    CPC ....... *G06V 20/588* (2022.01); *G01C 21/3819* (2020.08); *G06K 9/6201* (2013.01)

(58) Field of Classification Search
    CPC .............. G06V 20/588; G01C 21/3819; G01C 21/3863; G06K 9/6201; B60W 40/06; B60W 60/001
See application file for complete search history.

(56) References Cited

U.S. PATENT DOCUMENTS

| | | | | |
|---|---|---|---|---|
| 10,867,190 | B1 * | 12/2020 | Vajna | G06V 10/82 |
| 2010/0259617 | A1 * | 10/2010 | Kawasaki | G06K 9/6292 |
| | | | | 348/148 |
| 2015/0367781 | A1 * | 12/2015 | Takemae | G06V 10/751 |
| | | | | 348/148 |
| 2021/0248391 | A1 * | 8/2021 | Kizumi | G01C 21/3819 |

FOREIGN PATENT DOCUMENTS

JP      2006-292475      10/2006

* cited by examiner

*Primary Examiner* — Md K Talukder
(74) *Attorney, Agent, or Firm* — Amin, Turocy & Watson, LLP

(57) ABSTRACT

According to an embodiment, a surroundings recognition device includes an acquirer configured to acquire first road information including a road boundary near a host vehicle from map information on the basis of position information of the host vehicle, a recognizer configured to recognize a road boundary near the host vehicle on the basis of an output of an external environment sensor, and a determiner configured to determine that a first road boundary matches a second road boundary when the second road boundary included in second road information that is a recognition result of the recognizer is within a road boundary determination area based on a position of the first road boundary included in the first road information acquired by the acquirer. The determiner sets a size of the road boundary determination area on the basis of a predetermined condition.

10 Claims, 10 Drawing Sheets

SURROUNDINGS RECOGNITION DEVICE, AND SURROUNDINGS RECOGNITION METHOD

CROSS-REFERENCE TO RELATED APPLICATION

Priority is claimed on Japanese Patent Application No. 2020-019193, filed Feb. 6, 2020, the content of that is incorporated herein by reference.

BACKGROUND

Field of the Invention

The present invention relates to a surroundings recognition device, a surroundings recognition method, and a storage medium.

Description of Related Art

In recent years, research on technology for controlling the driving of a vehicle on the basis of a result of recognizing the surroundings of the vehicle has been conducted. In relation to this, technology for more easily determining the same physical object when a distance from a vehicle to a physical object is longer in a case in which it is determined whether a physical object near the vehicle detected by radar and a physical object near the vehicle detected by an image of a camera are the same physical object is known (for example, Japanese Unexamined Patent Application, First Publication No. 2006-292475).

SUMMARY

However, in the conventional technology, the accuracy of recognition may not be able to be improved because both the accuracy of detection of a physical object near a vehicle by radar and the accuracy of detection of a physical object near the vehicle by an image of a camera may be degraded according to a surrounding environment.

Aspects of the present invention have been made in consideration of the above-described circumstances and an objective of the present invention is to provide a surroundings recognition device, a surroundings recognition method, and a storage medium capable of improving the accuracy of recognition of the surroundings of a vehicle.

A surroundings recognition device, a surroundings recognition method, and a storage medium according to the present invention adopt the following configurations.

(1): According to an aspect of the present invention, there is provided a surroundings recognition device including: an acquirer configured to acquire first road information including a road boundary near a host vehicle from map information on the basis of position information of the host vehicle; a recognizer configured to recognize a road boundary near the host vehicle on the basis of an output of an external environment sensor; and a determiner configured to determine that a first road boundary matches a second road boundary when the second road boundary included in second road information that is a recognition result of the recognizer is within a road boundary determination area based on a position of the first road boundary included in the first road information acquired by the acquirer, wherein the determiner sets a size of the road boundary determination area on the basis of a predetermined condition.

(2): In the above-described aspect (1), the road boundary determination area is an area having a predetermined width in a direction orthogonal to a longitudinal direction of the first road boundary on the basis of a position of the first road boundary and an area of a side further away than the first road boundary is smaller than an area of a side nearer to the first road boundary when viewed from the host vehicle.

(3): In the above-described aspect (1), the surroundings recognition device further includes a position measurer configured to measure a position of the host vehicle, wherein the determiner sets a size of the road boundary determination area on the basis of accuracy of the position of the host vehicle measured by the position measurer.

(4): In the above-described aspect (1), the determiner sets the size of the road boundary determination area on the basis of the elapsed period from a date on which the map information has been created or updated.

(5): In the above-described aspect (1), the determiner calculates a proportion of the first road boundary included in a predetermined section within the road boundary determination area and determines that the first road boundary matches the second road boundary when the calculated proportion is greater than or equal to a threshold value, and a weight for the proportion is made larger when a road boundary of a first area nearer to the host vehicle within the second road boundary is within the road boundary determination area than when a road boundary of a second area further away from the host vehicle than the first area is within the road boundary determination area when viewed from the host vehicle.

(6): In the above-described aspect (2), the determiner increases a width of the road boundary determination area on the basis of a speed of the host vehicle.

(7): In the above-described aspect (1), the determiner decreases the road boundary determination area when the recognizer has recognized another vehicle near the host vehicle as compared with when no other vehicles have been recognized.

(8): In the above-described aspect (1), the determiner performs a plurality of determinations of whether or not the first road boundary matches the second road boundary, determines that the first road boundary matches the second road boundary when a matching count is greater than or equal to a predetermined number, and resets the matching count when the map information has been updated.

(9): In the above-described aspect (1), the determiner decreases the road boundary determination area when the first road boundary includes a structure as compared with when the first road boundary does not include the structure.

(10): According to an aspect of the present invention, there is provided a surroundings recognition method including: acquiring, by a computer, first road information including a road boundary near a host vehicle from map information on the basis of position information of the host vehicle; recognizing, by the computer, a road boundary near the host vehicle on the basis of an output of an external environment sensor; determining, by the computer, that a first road boundary matches a second road boundary when the second road boundary included in second road information that is a recognition result is within a road boundary determination area based on a position of the first road boundary included in the acquired first road information; and setting, by the computer, a size of the road boundary determination area on the basis of a predetermined condition.

(11): According to an aspect of the present invention, there is provided a computer-readable non-transitory storage medium storing a program for causing a computer to:

acquire first road information including a road boundary near a host vehicle from map information on the basis of position information of the host vehicle; recognize a road boundary near the host vehicle on the basis of an output of an external environment sensor; determine that a first road boundary matches a second road boundary when the second road boundary included in second road information that is a recognition result is within a road boundary determination area based on a position of the first road boundary included in the acquired first road information; and set a size of the road boundary determination area on the basis of a predetermined condition.

According to the above-described aspects (1) to (11), it is possible to improve the accuracy of recognition of surroundings of a vehicle.

DESCRIPTION OF EMBODIMENTS

Embodiments of a surroundings recognition device, a surroundings recognition method, and a storage medium of the present invention will be described below with reference to the drawings. Hereinafter, an embodiment in which the surroundings recognition device is applied to an automated driving vehicle will be described as an example. For example, automated driving is a process of automatically controlling one or both of steering and acceleration/deceleration of the vehicle to execute driving control. The above-described driving control may include driving control of an adaptive cruise control system (ACC), a traffic jam pilot (TJP), an automated lane change (ALC), a lane keeping assistance system (LKAS), a collision mitigation brake system (CMBS), and the like. In the automated driving vehicle, driving control according to a manual operation (so-called manual driving) of an occupant may be executed.

[Overall Configuration]

Figure 1:
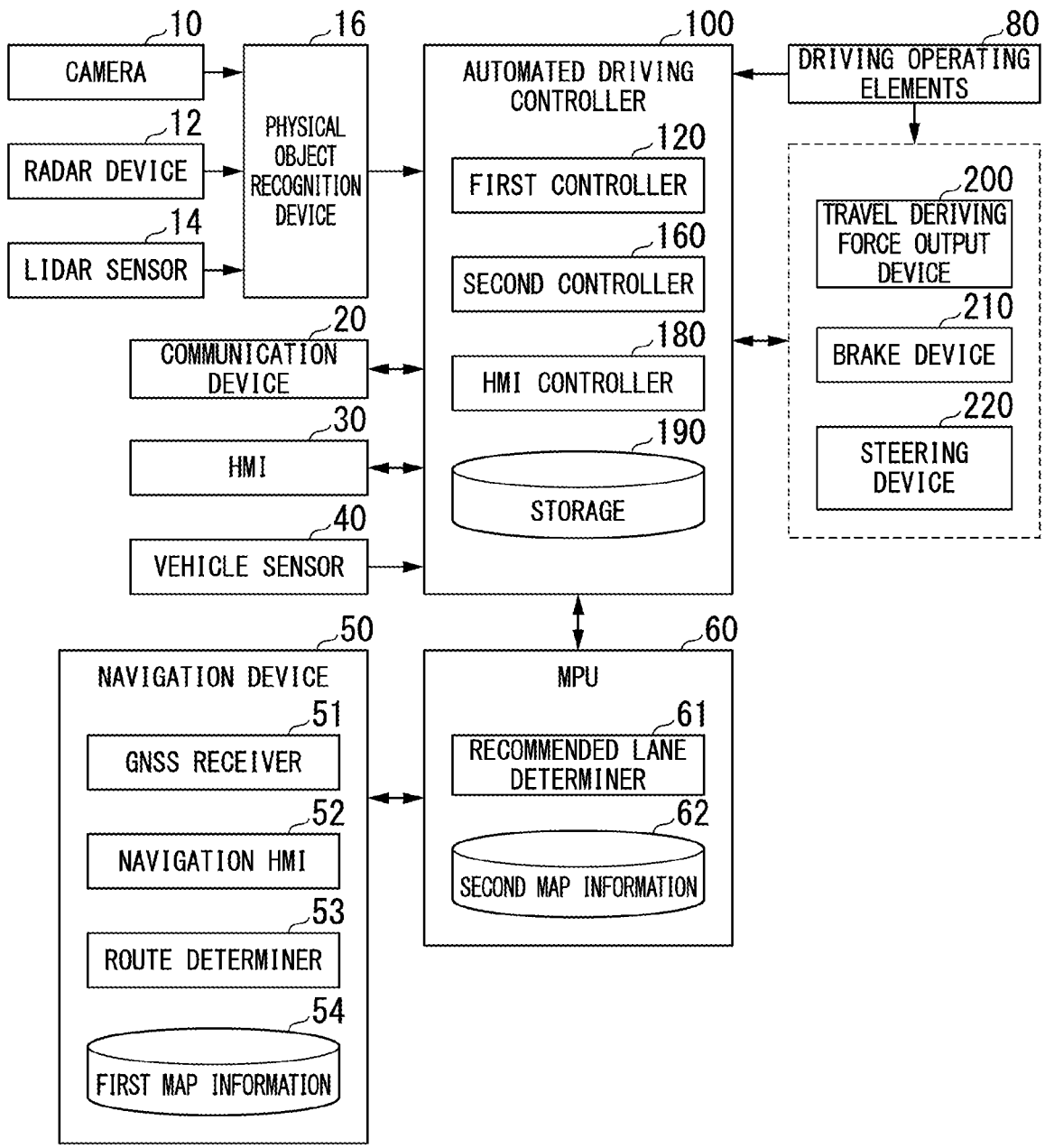
FIG. 1 is a configuration diagram of a vehicle system including a surroundings recognition device according to an embodiment.

FIG. 1 is a configuration diagram of a vehicle system 1 including a surroundings recognition device according to an embodiment. For example, a vehicle (hereinafter referred to as a host vehicle M) in which the vehicle system 1 is mounted is a two-wheeled vehicle, a three-wheeled vehicle, or a four-wheeled vehicle. A drive source of the vehicle is an internal combustion engine such as a diesel engine or a gasoline engine, an electric motor, or a combination thereof. The electric motor is operated using electric power generated by an electric power generator connected to the internal combustion engine or electric power with which a battery (a power storage battery) such as a secondary cell or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, driving operating elements 80, an automated driving controller 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. A combination of the camera 10, the radar device 12, and the LIDAR sensor 14 is an example of an "external environment sensor." The "external environment sensor" may include a physical object recognition device 16. An example of the "surroundings recognition device" is a combination of the external environment sensor, the vehicle sensor 40, and a recognizer 130 and a storage 190 to be described below.

For example, the camera 10 is a digital camera using a solid-state imaging element such as a charge coupled device (CCD) or a complementary metal oxide semiconductor (CMOS). The camera 10 is attached to any position on the host vehicle M in which the vehicle system 1 is mounted. When the view in front of the host vehicle M is imaged, the camera 10 is attached to an upper part of a front windshield, a rear surface of a rearview mirror, a front part of a vehicle body, or the like. When the view to the rear is imaged, the camera 10 is attached to an upper part of a rear windshield, a back door, or the like. When the view to the side is imaged, the camera 10 is attached to a door mirror or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object near the host vehicle M. The radar device 12 is attached to any location on the host vehicle M. The radar device 12 may detect a position and speed of the physical object in a frequency modulated continuous wave (FM-CW) scheme.

The LIDAR sensor 14 radiates light to the vicinity of the host vehicle M and measures scattered light. The LIDAR sensor 14 detects a distance to an object on the basis of time from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving controller 100. The physical object recognition device 16 may output detection results of the camera 10, the radar device 12, and the LIDAR sensor 14 to the automated driving controller 100 as they are. In this case, the physical object recognition device 16 may be omitted from the vehicle system 1.

The communication device 20 uses a network NW, for example, such as a cellular network, a Wi-Fi network, a Bluetooth (registered trademark) network, a dedicated short range communication (DSRC) network, a local area network (LAN), a wide area network (WAN), or the Internet, to communicate with, for example, other vehicles near the host vehicle M, a communication device of a user using the host vehicle M, or various types of server devices.

The HMI 30 presents various types of information to an occupant of the host vehicle M and receives an input operation by the occupant. For example, the HMI 30 includes various types of display devices, a speaker, a buzzer, a touch panel, a switch, keys and the like.

The vehicle sensor 40 includes a vehicle speed sensor configured to detect the speed of the host vehicle M, an acceleration sensor configured to detect acceleration, a yaw rate sensor configured to detect a yaw rate (for example, a rotational angular speed around a vertical axis passing through the center of gravity of the host vehicle M), a direction sensor configured to detect a direction of the host vehicle M, and the like. The vehicle sensor 40 may include a position sensor that detects the position of the host vehicle M. The position sensor is an example of a "position measurer." The position sensor is, for example, a sensor that acquires position information (longitude/latitude information) from a Global Positioning System (GPS) device. The position sensor may be a sensor that acquires position information using a global navigation satellite system (GNSS) receiver 51 of the navigation device 50. The vehicle sensor 40 may derive the speed of the host vehicle M from a difference (i.e., a distance) in the position information obtained by the position sensor in a predetermined time period. A detection result of the vehicle sensor 40 is output to the automated driving controller 100.

For example, the navigation device 50 includes a global navigation satellite system (GNSS) receiver 51, a navigation HMI 52, and a route determiner 53. The navigation device 50 retains first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The GNSS receiver 51 may be provided in the vehicle sensor 40. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may transmit a current position and a destination to a navigation server via the communication device 20 and acquire a route equivalent to the route on the map from the navigation server. The navigation device 50 outputs the determined route on the map to the MPU 60.

For example, the MPU 60 includes a recommended lane determiner 61 and retains second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines a recommended lane for each block with reference to the second map information 62. The recommended lane determiner 61 determines in what lane numbered from the left the vehicle will travel. The recommended lane determiner 61 determines the recommended lane so that the host vehicle M can travel along a reasonable route for traveling to a branching destination when there is a branch point in the route on the map.

The second map information 62 is map information that is more accurate than the first map information 54. The second map information 62 includes, for example, the number of lanes, a type of road division line, information about the center of the lane, information about the road boundary, and the like. The second map information 62 may include information about whether or not the road boundary is a boundary including a structure through which the passage (including crossing and contact) of a vehicle is impossible. The structure is, for example, a guardrail, a curb, a median strip, a fence, or the like. A case in which the passage of the vehicle is impossible may include the presence of a low step that allows passage if swinging of the vehicle, which would not normally occur, is allowed. The second map information 62 may include road shape information, traffic regulation information (for example, signs, stop lines, or pedestrian crosswalks), address information (address/postal code), facility information, parking lot information, telephone number information, and the like. For example, the road shape information includes a radius of curvature (or curvature) of the road, a width, a slope, and the like. The second map information 62 may be updated at any time by the communication device 20 communicating with an external device. The first map information 54 and the second map information 62 may be integrally provided as map information. The map information may be stored in the storage 190.

The driving operating elements 80 include, for example, a steering wheel, an accelerator pedal, and a brake pedal. Also, the driving operating elements 80 may include a shift lever, a steering wheel variant, a joystick, and other operating elements. For example, an operation detector that detects an amount of operation of the operating element by the occupant or the presence or absence of an operation is attached to each of the driving operating elements 80. The operation detector detects, for example, a steering angle and a steering torque of the steering wheel, an amount of depression of the accelerator pedal or the brake pedal, and the like. The operation detector outputs detection results to the automated driving controller 100 or some or all of the travel driving force output device 200, the brake device 210, and the steering device 220.

The automated driving controller 100 includes, for example, a first controller 120, a second controller 160, an HMI controller 180, and the storage 190. Each of the first controller 120, the second controller 160, and the HMI controller 180 is implemented, for example, by a hardware processor such as a central processing unit (CPU) executing a program (software). Some or all of these components are implemented by hardware (a circuit including circuitry) such as a large-scale integration (LSI) circuit, an application specific integrated circuit (ASIC), a field-programmable gate array (FPGA), or a graphics processing unit (GPU) or may be implemented by software and hardware in cooperation. The above-described program may be pre-stored in a storage device (a storage device including a non-transitory storage medium) such as an HDD or a flash memory of the automated driving controller 100 or may be stored in a removable storage medium such as a DVD, a CD-ROM, or a memory card and installed in the HDD or the flash memory of the automated driving controller 100 when the storage medium (the non-transitory storage medium) is mounted in a drive device, a card slot, or the like.

The storage 190 may be implemented by the various types of storage devices described above, an electrically erasable programmable read only memory (EEPROM), a read only memory (ROM), a random access memory (RAM), or the like. For example, the storage 190 stores various types of information, programs, and the like related to surroundings recognition and driving control according to the embodiments.

Map information (for example, the first map information 54 and the second map information 62) may be stored in the storage 190. In the storage 190, for example, information about a reference date such as a creation date or an update date of map information may be stored. In the storage 190, for example, information about the position accuracy (position error) of a position sensor (the GPS device or the GNSS receiver 51) that detects the position of the host vehicle M may be stored.

Figure 2:
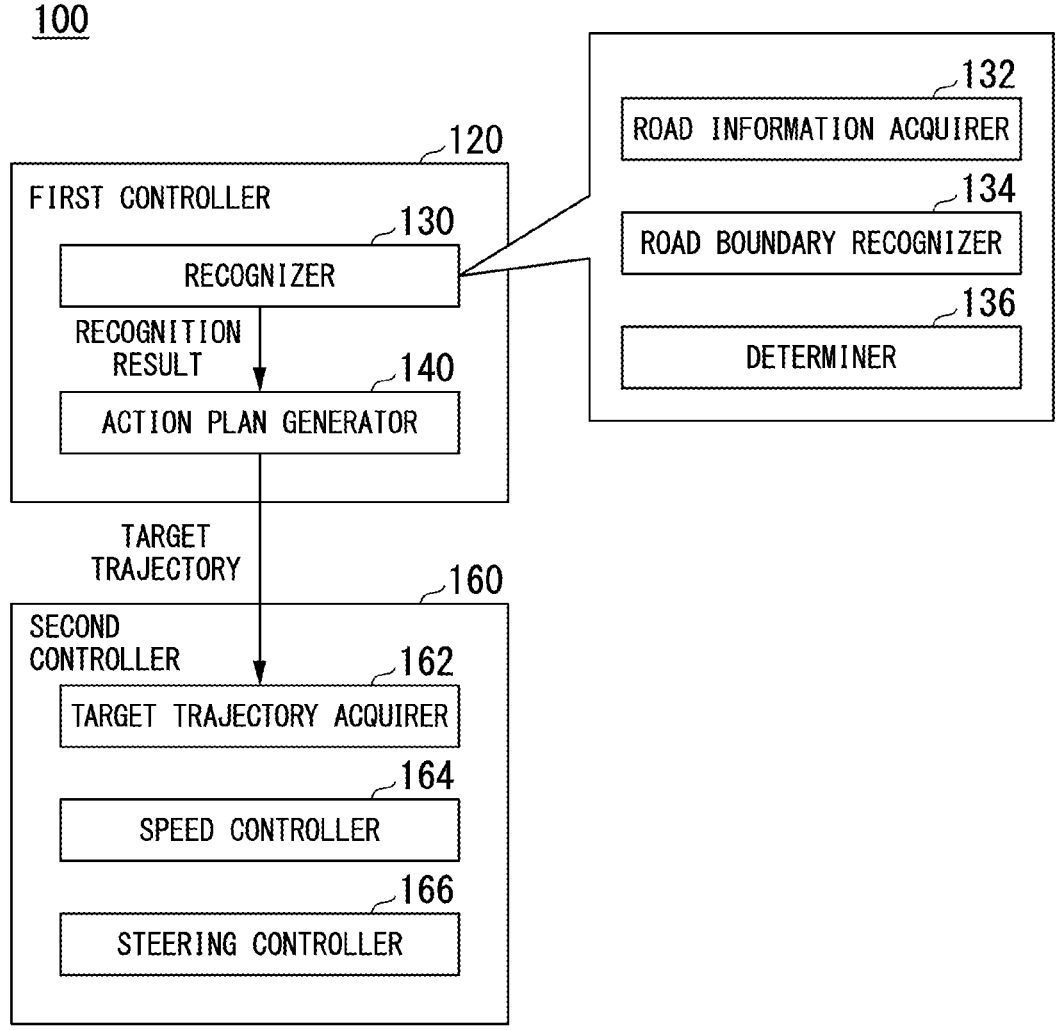
FIG. 2 is a functional configuration diagram of a first controller and a second controller.

FIG. 2 is a functional configuration diagram of the first controller 120 and the second controller 160. The first controller 120 includes, for example, the recognizer 130 and an action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing integrated evaluation by assigning scores to both recognitions. Thereby, the reliability of automated driving is ensured. For example, the first controller 120 executes control related to automated driving of the host vehicle M on the basis of an instruction from the MPU 60, the HMI controller 180, or the like.

The recognizer 130 recognizes states of a position, a velocity, acceleration, and the like of a physical object near the host vehicle M on the basis of information input from the camera 10, the radar device 12, and the LIDAR sensor 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

The recognizer 130 includes, for example, a road information acquirer 132, a road boundary recognizer 134, and a determiner 136. The road information acquirer 132 is an example of an "acquirer." The road boundary recognizer 134 is an example of a "recognizer." Details of these functions will be described below.

The action plan generator 140 generates an action plan for causing the host vehicle M to travel according to automated driving. For example, the action plan generator 140 generates a future target trajectory along which the host vehicle M is allowed to automatically travel (independently of a driver's operation) so that the host vehicle M can generally travel in the recommended lane determined by the recommended lane determiner 61 and further cope with a surrounding situation of the host vehicle M on the basis of a recognition result of the recognizer 130 or a surrounding road shape based on a current position of the host vehicle M acquired from the map information. For example, the target trajectory includes a speed element. For example, the target trajectory is represented by sequentially arranging points (trajectory points) at which the host vehicle M is required to arrive. The trajectory point is a point at which the host vehicle M is required to arrive for each predetermined traveling distance (for example, about several meters [m]). On the other hand, a target speed and target acceleration for each predetermined sampling time period (for example, about several tenths of a second [sec]) are generated as parts of the target trajectory. The trajectory point may be a position at which the host vehicle M is required to arrive at the sampling time for each predetermined sampling time period. In this case, information of the target speed or the target acceleration is represented by an interval between trajectory points.

The action plan generator 140 may set an automated driving event when the target trajectory is generated. For example, the events include a constant-speed traveling event for causing the host vehicle M to travel in the same lane at a constant speed, a tracking traveling event for causing the host vehicle M to track another vehicle (hereinafter referred to as a preceding vehicle) that is within a predetermined distance (for example, within 100 [m]) in front of the host vehicle M and is closest to the host vehicle M, a lane change event for causing the host vehicle M to make a lane change from a host vehicle lane to an adjacent lane, a branching event for causing the host vehicle M to move to a lane in a destination direction at a branch point of a road, a merging event for causing the host vehicle M to move to a lane of a main road at a merging point, a takeover event for ending automated driving and performing switching to manual driving, and the like. For example, the events may include an overtaking event for causing the host vehicle M to make a lane change to a previous lane again after the host vehicle M temporarily makes a lane change to an adjacent lane and overtakes a preceding vehicle in the adjacent lane, an avoidance event for causing the host vehicle M to perform at least one of braking and steering in order to avoid an obstacle in front of the host vehicle M, and the like.

Also, for example, the action plan generator 140 may change a previously determined event to another event with respect to a current section, or may set a new event with respect to a current section, in accordance with a recognized situation of surroundings of the host vehicle M when the host vehicle M is traveling. Also, the action plan generator 140 may change a previously set event to another event with respect to a current section, or may set a new event with respect to a current section, in accordance with an operation of the occupant on the HMI 30. The action plan generator 140 generates a target trajectory according to the set event.

The second controller 160 controls the travel driving force output device 200, the brake device 210, and the steering device 220 so that the host vehicle M passes through the target trajectory generated by the action plan generator 140 at a scheduled time.

The second controller 160 includes, for example, a target trajectory acquirer 162, a speed controller 164, and a steering controller 166. The target trajectory acquirer 162 acquires information of the target trajectory (trajectory points) generated by the action plan generator 140 and causes a memory (not shown) to store the information. The speed controller 164 controls the travel driving force output device 200 or the brake device 210 on the basis of the speed element associated with the target trajectory stored in the memory. The steering controller 166 controls the steering device 220 in accordance with a degree of curvature of the target trajectory stored in the memory. For example, processes of the speed controller 164 and the steering controller 166 are implemented by a combination of feed-forward control and feedback control. As one example, the steering controller 166 executes feed-forward control according to a curvature radius (or curvature) of the road in front of the host vehicle M and feedback control based on a deviation of the host vehicle M from the target trajectory in combination.

Returning to FIG. 1, the HMI controller 180 notifies the occupant of predetermined information by means of the HMI 30. For example, the predetermined information may include information related to traveling of the host vehicle M such as information about the state of the host vehicle M and information about driving control. The information about the state of the host vehicle M includes, for example, a speed of the host vehicle M, an engine speed, a shift position, and the like. Also, the information about the driving control includes, for example, information about whether or not driving control based on automated driving (for example, lane change control) is to be executed, information for asking about whether or not to start automated driving, information about a driving control situation based on automated driving, and the like. Also, the predetermined information may include information that is not related to the traveling of the host vehicle M, such as content (for example, a movie) stored in a storage medium such as a TV program or a DVD. Also, the predetermined information may include, for example, information about a current position and a destination in automated driving, and the remaining amount of fuel of the host vehicle M. The HMI controller 180 may output information received by the HMI 30 to the communication device 20, the navigation device 50, the first controller 120, and the like.

The HMI controller 180 may cause the HMI 30 to output information about the progress of a determination, a determination result, and a recognition result based on the determination result in the determiner 136 to be described below. The HMI controller 180 may transmit various types of information to be output to the HMI 30 to the terminal device used by the user of the host vehicle M via the communication device 20.

The travel driving force output device 200 outputs a travel driving force (torque) for enabling the vehicle to travel to driving wheels. For example, the travel driving force output device 200 may include a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the accelerator pedal that is the driving operating element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the brake pedal that is the driving operating element 80 so that brake torque according to a braking operation is output to each wheel. The brake device 210 may include a mechanism configured to transfer the hydraulic pressure generated by an operation of the brake pedal to the cylinder via a master cylinder as a backup. The brake device 210 is not limited to the above-described configuration and may be an electronically controlled hydraulic brake device configured to control the actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the steering wheel that is the driving operating element 80 to cause the direction of the steerable wheels to be changed.

Figure 3:
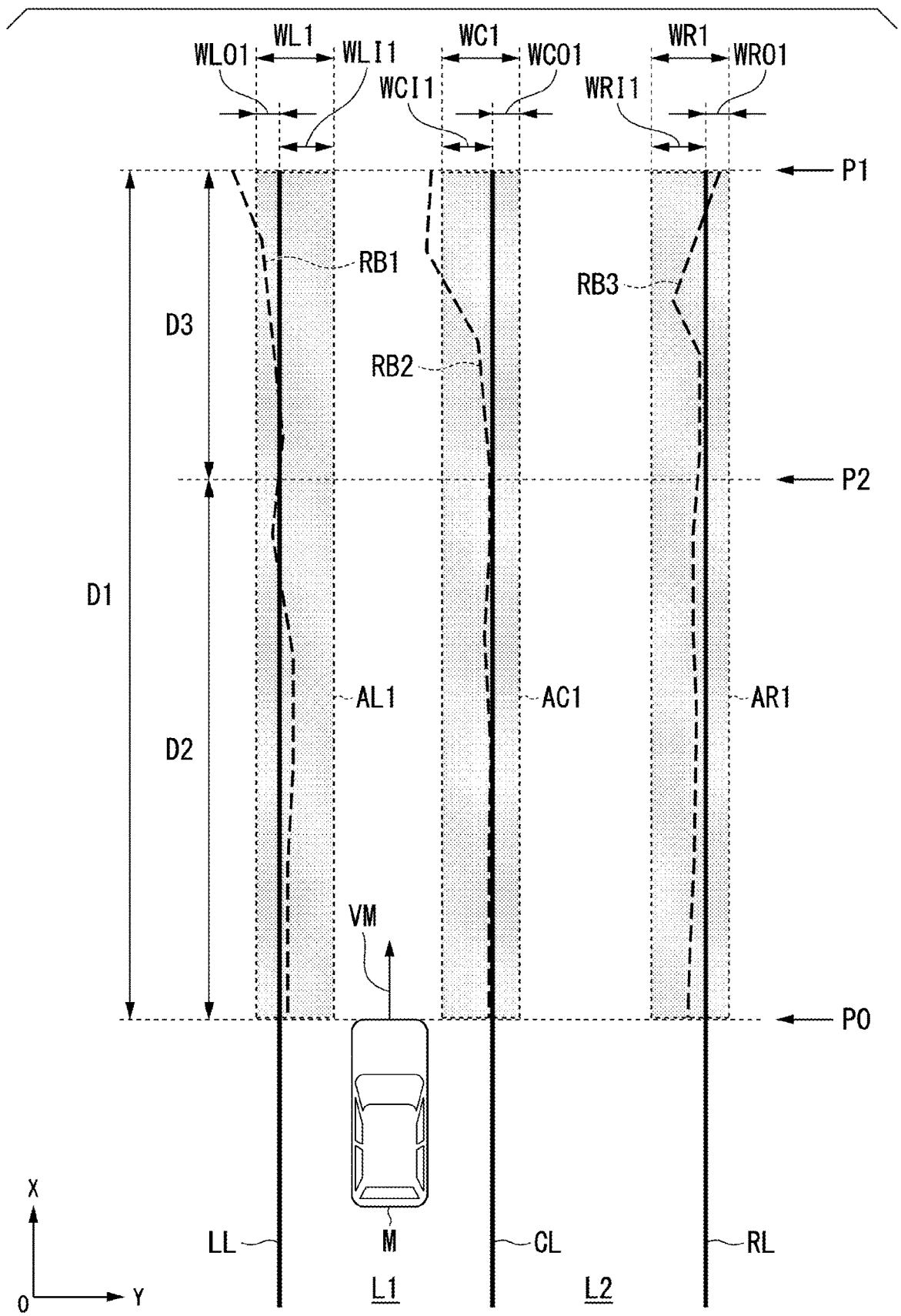
FIG. 3 is a diagram for describing functions of a road information acquirer, a road boundary recognizer, and a determiner.

[Functions of Recognizes] Next, details of functions of the road information acquirer 132, the road boundary recognizer 134, and the determiner 136 will be described. FIG. 3 is a diagram for describing the functions of the road information acquirer 132, the road boundary recognizer 134, and the determiner 136. In the example of FIG. 3, two lanes L1 and L2 in which traveling is possible in the same direction (an X-axis direction shown in FIG. 3) are shown. The lane L1 is partitioned by division lines LL and CL and the lane L2 is partitioned by division lines CL and RL. It is assumed that the host vehicle M is traveling in the lane L1 at a speed VM.

The road information acquirer 132 acquires road information (which may be hereinafter referred to as "first road information") including boundary information of a road near a position of the host vehicle M with reference to map information (the first map information 54 and the second map information 62) on the basis of the position information of the host vehicle M. The road information acquirer 132 may acquire information about a type of road boundary. In this case, the types of road boundaries include, for example, a lane mark, a curb, a median strip, and a guardrail. The road information acquirer 132 may acquire a road division line pattern (for example, an array of solid lines and broken lines) from the second map information 62. It is assumed that the road division lines LL, CL, and RL shown in FIG. 3 are examples of road boundaries acquired by the road information acquirer 132. Hereinafter, a road boundary included in the first road information will be referred to as a "first road boundary." The road information acquirer 132 may acquire only the first road boundary with respect to the division lines LL and CL that partition the lane L1 in which the host vehicle M travels.

The road boundary recognizer 134 recognizes a road boundary near the host vehicle M on the basis of information input from some or all of the camera 10, the radar device 12, and the LIDAR sensor 14 via the physical object recognition device 16. The road boundary recognizer 134 outputs road information (which may be hereinafter referred to as "second road information") including the recognized road boundary. The "output" may include, for example, an output to a shared memory or a cache memory and transmission from one component to another component via a signal line or the like. The second road information includes, for example, information about a road on which the host vehicle M is traveling (the lane L1), a boundary of a road adjacent to the lane L1, or a boundary of a road connected to the lane L1 by an intersection or the like. Hereinafter, the road boundary included in the second road information will be referred to as a "second road boundary."

For example, the road boundary recognizer 134 analyzes an image captured by the camera 10 and recognizes a road boundary (for example, a division line) drawn on the road from information such as colors and shapes in the image which are analysis results. The road boundary recognizer 134 may determine whether or not a road boundary is a boundary including a structure on the basis of shape information included in the image captured by the camera 10 and information about a position and a distance of a physical object obtained from the radar device 12 and the LIDAR sensor 14. Because the detection results of the radar device 12 and the LIDAR sensor 14 differ according to the presence or absence of a structure, the presence or absence of a structure can be recognized more appropriately using the radar device 12 and the LIDAR sensor 14. In the example of FIG. 3, second road boundaries RB1 to RB3 included in the second road information are shown. The road boundary recognizer 134 may recognize only the second road boundary with respect to the division lines LL and CL that partition the lane L1 in which the host vehicle M is traveling.

The determiner 136 determines whether or not the first road boundary matches the second road boundary. For example, the determiner 136 sets a road boundary determination area based on the position of the first road boundary, determines that the first road boundary matches the second road boundary when the second road boundary is included within the set road boundary determination area, and determines that the first road boundary does not match the second road boundary when the second road boundary is not included within the road boundary determination area. The road boundary determination area has, for example, a predetermined width in a direction (in other words, a lane width direction) orthogonal to a longitudinal direction (in other words, a lane extension direction) of the first road boundary (the division line), and is an area represented by extending the width by a predetermined distance in the longitudinal direction of the first road boundary (the division line).

In the example of FIG. 3, widths WL1, WC1, and WR1 extended in directions orthogonal to longitudinal directions of the division lines LL, CL, and RL on the basis of positions of the division lines LL, CL, and RL serving as the first road boundary are set and areas where the set widths WL1, WC1, and WR1 are extended from a reference point P0 to a point P1 obtained through an extension by a predetermined distance (for example, a section D1) in the longitudinal directions of the division lines LL, CL, and RL are set as road boundary determination areas AL1, AC1, and AR1. The reference point P0 is a point based on the position of the host vehicle M detected by the vehicle sensor 40. For example, the reference point P0 is any position among a position on the front (front end) of the host vehicle M, a center position of the host vehicle M, and installation positions of the position sensor, the camera 10, and the like. The predetermined distance D1 is, for example, an estimated distance at which the external environment sensor can detect the second road information with predetermined accuracy. The predetermined distance D1 may be, for example, a fixed distance, or may be changed according to a vehicle speed of the host vehicle M or a road state (for example, inside of a tunnel, a sharp curve, a slope, the number of lanes, or a lane width).

The determiner 136 sets a road boundary determination area including an area of a side further away than the division line LL, CL, or RL and an area of a side nearer to the division line LL, CL, or RL when viewed from the host vehicle M. In this case, the determiner 136 sets the area of the side further away than the division line smaller than the area of the side nearer to the division line when viewed from the host vehicle M. In the example of FIG. 3, in the road boundary determination area AL1 associated with the division line LL, a width WLO1 of the side further away than the division line LL is set to be smaller than a width WLI1 of the side nearer to the division line LL when viewed from the host vehicle M. Also, likewise, a width WCO1 of the side further away than the division line CL is set to be smaller than a width WCI1 of the side nearer to the division line CL when viewed from the host vehicle M in the road boundary determination area AC1 and a width WRO1 of the side further away than the division line RL in the width direction of the lane is set to be smaller than the width WCI1 of the side nearer to the division line RL in the width direction of the lane when viewed from the host vehicle M in the road boundary determination area AR1. By increasing an area of a side nearer to the host vehicle M as described above, it is possible to easily match the first road boundary and the second road boundary on the host vehicle M side. Thus, when it is determined that the first road boundary matches the second road boundary, it is possible to easily restrict the host vehicle M from deviating from the lane L1 when the automated driving control of the host vehicle M is performed on the basis of the position of the second road boundary. The determiner 136 may set a width WLO and a width WLI as the same width and may set a width WCO and a width WCI and a width WRO and a width WRI as the same widths. The determiner 136 may change the road boundary determination area on the basis of a predetermined condition. The change pattern of the road boundary determination area in the determiner 136 will be described below.

When the second road boundary recognized by the road boundary recognizer 134 is included within the set road boundary determination area, the determiner 136 determines that the first road boundary matches the second road boundary. In the example of FIG. 3, the determiner 136 determines whether or not the second road boundary RB1 is included within the road boundary determination area AL1 and determines that the road division line LL matches the second road boundary RB1 when it is determined that the second road boundary RB1 is included within the road boundary determination area AL1. Also, likewise, the determiner 136 determines whether or not the second road boundary RB2 is included within the road boundary determination area AC1 and determines that the road division line CL matches the second road boundary RB2 when it is determined that the second road boundary RB2 is included within the road boundary determination area AC1. Also, the determiner 136 determines whether or not the second road boundary RB3 is included within the road boundary determination area AR1 and determines that the road division line RL matches the second road boundary RB3 when it is determined that the second road boundary RB3 is included within the road boundary determination area AR1.

The determiner 136 may determine that the second road boundary is within the area even if a part of the second road boundary is outside the area in addition to a case in which all of the second road boundary is included within the area in a predetermined section (for example, the section D1). In this case, for example, the determiner 136 calculates a proportion of the second road boundary in the predetermined section within the road boundary determination area and determines that the first road boundary matches the second road boundary when the calculated proportion is greater than or equal to a threshold value. The determiner 136 may increase a weight for the proportion when a road boundary nearer to the host vehicle M within the second road boundary is within the road boundary determination area as compared with when a road boundary further away from the host vehicle M is within the road boundary determination area. In the example of FIG. 3, when a proportion of the second road boundary within a first area in a road boundary determination area (the first area) of a section D2 from the reference point P0 to the point P2 is denoted by a and a proportion of the second road boundary within a second area in a road boundary determination area (the second area) of a section D3 (a section from the point P2 to the point P1) farther than the section D2 when viewed from the host vehicle M is denoted by b, the determiner 136 calculates a proportion (a×w+b) of the second road boundary within the road boundary determination area by multiplying the proportion a by a weight w (w>1) and determines whether or not the second road boundary is included within the road boundary determination area by comparing a calculation result with a threshold value. As described above, it is possible to more appropriately determine the matching of the road boundary by applying a weight to a proportion of the second road boundary within the road boundary determination area on the basis of a distance from the host vehicle M and making a determination. The lengths of the sections D2 and D3 may be variably set according to a speed of the host vehicle M or a road shape.

The determiner 136 may change a size of the road boundary determination area in accordance with the distance from the host vehicle M instead of applying the weight to the proportion. For example, the determiner 136 can increase a proportion of the second road boundary far from the host vehicle M included within the road boundary determination area when viewed from the host vehicle M by making the width of the determination area (the length in the direction orthogonal to the longitudinal direction) larger in the section D2 than in the section D3.

The determiner 136 may perform a plurality of determinations of whether or not the first road boundary matches the second road boundary at predetermined intervals and determine that the first road boundary matches the second road boundary when a matching count is greater than or equal to a predetermined number. The predetermined interval may be changed in accordance with, for example, the speed of the host vehicle M or the road information, or may be a fixed interval. Thereby, the determination of matching can be performed more accurately. When the map information has been updated, the determiner 136 may reset the matching count counted so far. Thereby, it is possible to perform a highly accurate determination of matching based on the updated map information.

For example, when it is determined that the first road boundary matches the second road boundary, the determiner 136 recognizes the position of the first road boundary as the road boundary position and identifies the position of the host vehicle M on the basis of the recognized road boundary or outputs other recognition results to the action plan generator 140. For example, when it is determined that the first road boundary does not match the second road boundary, the determiner 136 recognizes the position of the second road boundary as the road boundary position and identifies the position of the host vehicle M on the basis of the recognized road boundary or outputs other recognition results to the action plan generator 140.

[Change in Road Boundary Determination Area]

Hereinafter, a road boundary determination area change process of the determiner 136 (including a setting process) will be described separately for several change patterns.

<First Change Pattern>

In a first change pattern, the determiner 136 changes the road boundary determination area in accordance with the accuracy of detection of a position of the host vehicle M by the position sensor included in the vehicle sensor 40. For example, when a measurement result of the GPS device serving as the position sensor is used, a position error differs according to a region, weather, or the like. The "region" includes not only information about a place but also information about geographic features (buildings, tunnels, mountains, and forests) near the place. For example, in the case of traveling on a road surrounded by high-rise buildings or surrounding mountains, a position error becomes larger than that in the case of traveling on a road around which there are no buildings or mountains. For example, when the surrounding weather is cloudy, rainy, or foggy, the position error is larger than that when it is sunny. When the position error becomes large, an error between the first road boundary acquired by the road information acquirer 132 from the map information and the actual road boundary also becomes large, so that, even if the first road boundary matches the second road boundary, the position of the road boundary may not be a correct position. Therefore, for example, the determiner 136 determines that the accuracy of the detection of the position of the host vehicle M is high when there is no geographic feature that causes an error of a position of the host vehicle M and the weather is fine and determines that the accuracy of the detection of the position of the host vehicle M is low when there is a geographic feature that causes a position error or when the weather is cloudy, rainy, or foggy. When the accuracy of the detection of the position of the host vehicle M by the position sensor is low, the determiner 136 sets a wide road boundary determination area as compared with when the accuracy is high. When the accuracy of the detection of the position is high, the determiner 136 sets a narrow road boundary determination area as compared with when the accuracy is low.

Figure 4:
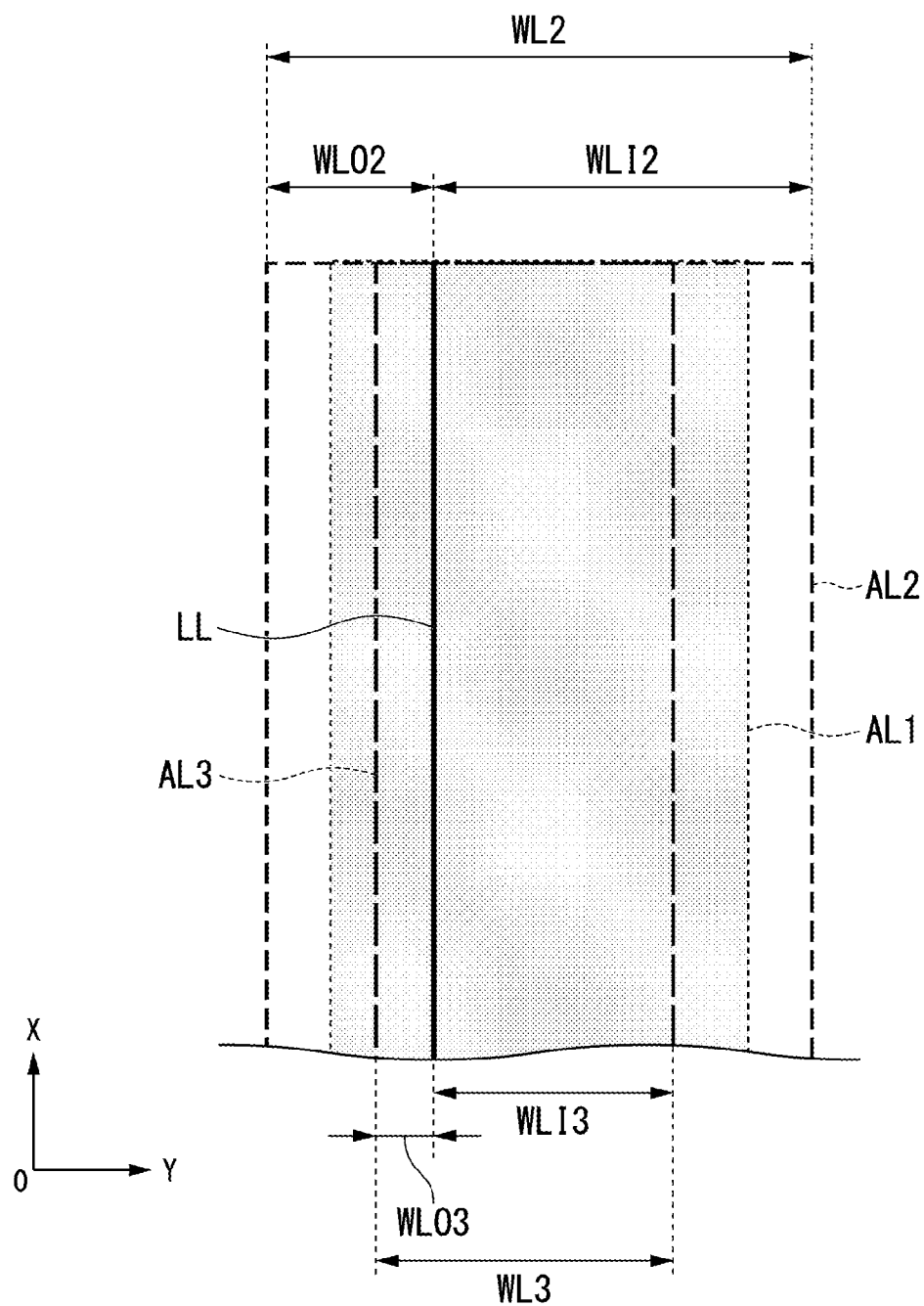
FIG. 4 is a diagram for describing a change in a road boundary determination area.

FIG. 4 is a diagram for describing a change in the road boundary determination area. In the example of FIG. 4, a case in which a part of the road boundary determination area AL1 based on the position of the division line LL shown in FIG. 3 is enlarged is shown. Hereinafter, it is assumed that a process of changing the road boundary determination area with respect to the division line LL is similarly performed with respect to other division lines (for example, the division lines CL and RL). The same is true for the following description.

In the first change pattern, the road boundary determination area AL1 is an example of a reference area. For example, when the accuracy of the detection of the position of the host vehicle M by the position sensor is low, the determiner 136 sets the road boundary determination area AL2 larger than the road boundary determination area AL1 that is the reference area (or a road boundary determination area AL3 to be described below). In this case, for example, the determiner 136 makes the width WL2 of the road boundary determination area larger than the width WL1 of the road boundary determination area AL1 to increase the road boundary determination area AL2. When the width WL2 is set, the determiner 136 may make a width WLO2 of the road boundary determination area of the side further away than the division line LL (the left side of the division line LL in FIG. 4) larger than the width WLO1 of the road boundary determination area AL1 when viewed from the host vehicle M, may make a width WLI2 of the road boundary determination area of the side nearer to the division line LL (the right side of the division line LL in FIG. 4) larger than the width Will of the road boundary determination area AL1 when viewed from the host vehicle M, or may set both the width WLO2 and the width WLI2 as described above. As described above, it is possible to easily determine that the first road boundary matches the second road boundary even if the position accuracy is low by setting a wide road boundary determination area when the accuracy of the position sensor is low.

When the accuracy of the detection of the position of the host vehicle M by the position sensor is high, the determiner 136 sets the road boundary determination area AL3 smaller than the road boundary determination area AL1 that is the reference area (or the road boundary determination area AL2). In this case, for example, the determiner 136 narrows the road boundary determination area AL3 by making the width WL3 of the road boundary determination area AL3 smaller than the width WL1 of the road boundary determination area AL1. When the width WL3 is set, the determiner 136 may make a width WLO3 of the road boundary determination area of the side further away than the division line LL smaller than the width WLO1 when viewed from the host vehicle M, may make the width WLI3 of the road boundary determination area of the side nearer to the division line LL smaller than the width WLI1 when viewed from the host vehicle M, or may set both the width WLO3 and the width WLI3 as described above. Thereby, when the accuracy of the position sensor is high, the position of the road boundary can be recognized with higher accuracy by narrowing the road boundary determination area.

<Second Change Pattern>

In a second change pattern, the determiner 136 changes the road boundary determination area on the basis of an elapsed period from a date when the map information has been created or updated. In this case, the determiner 136 acquires the date when the map information stored in the storage 190 or the map information acquired from the external device via the communication device 20 has been created or updated and derives an elapsed period from the acquired date to the present date. The determiner 136 sets a larger road boundary determination area when the elapsed period is longer than or equal to a first predetermined period than when the elapsed period is less than the first predetermined period. For example, in FIG. 4, if the road boundary determination area when the elapsed period is less than the first predetermined period is the area AL1, the determiner 136 sets the road boundary determination area when the elapsed period is longer than or equal to the first predetermined period as the road boundary determination area AL2. The determiner 136 may increase the width of the road boundary determination area in a step-by-step manner in accordance with a length of the elapsed period to increase the entire road boundary determination area. It is possible to easily match the first road boundary and the second road boundary by increasing the road boundary determination area when the map information is old. Therefore, it is possible to more appropriately recognize the road boundary and the like near the host vehicle M.

The determiner 136 sets a smaller road boundary determination area when the above-described elapsed period is less than a second predetermined period than when the above-described elapsed period is longer than or equal to the second predetermined period. The second predetermined period is a period different from the first predetermined period, but may be the same as the first predetermined period. For example, in FIG. 4, if the road boundary determination area when the elapsed period is longer than or equal to the second predetermined period is the area AL1, the determiner 136 sets the road boundary determination area when the elapsed period is less than the second predetermined period as the road boundary determination area AL3. The determiner 136 may narrow the entire area by narrowing the width of the road boundary determination area in a step-by-step manner in accordance with a short length of the elapsed period. When the map information is new, the accuracy is high, so that it is possible to accurately determine the position of the road boundary by narrowing the road boundary determination area.

<Third Change Pattern>

In a third change pattern, the determiner 136 changes the road boundary determination area on the basis of the speed of the host vehicle M detected by the vehicle sensor 40. In this case, for example, the determiner 136 makes a change so that the road boundary determination area increases as the speed of the host vehicle M decreases. For example, in the third change pattern, it is assumed that the road boundary determination area when the speed VM of the host vehicle M is greater than or equal to a first speed is the area AL3. In this case, the determiner 136 sets the road boundary determination area when the speed of the host vehicle M is less than the first speed as the road boundary determination area AL1 and sets the road boundary determination area when the speed of the host vehicle M is less than a second speed, which is less than the first speed, as the road boundary determination area AL2.

According to the third change pattern described above, it is possible to more appropriately determine matching between the first road boundary and the second road boundary in accordance with the speed of the host vehicle M. When the speed is slow, a distance of the road boundary that can be recognized per predetermined time period is reduced, so that it is possible to restrict the accuracy of recognition from being lowered even if the accuracy of recognition of a road boundary is lowered as compared with when the speed of the host vehicle M is high.

<Fourth Change Pattern>

Figure 5:
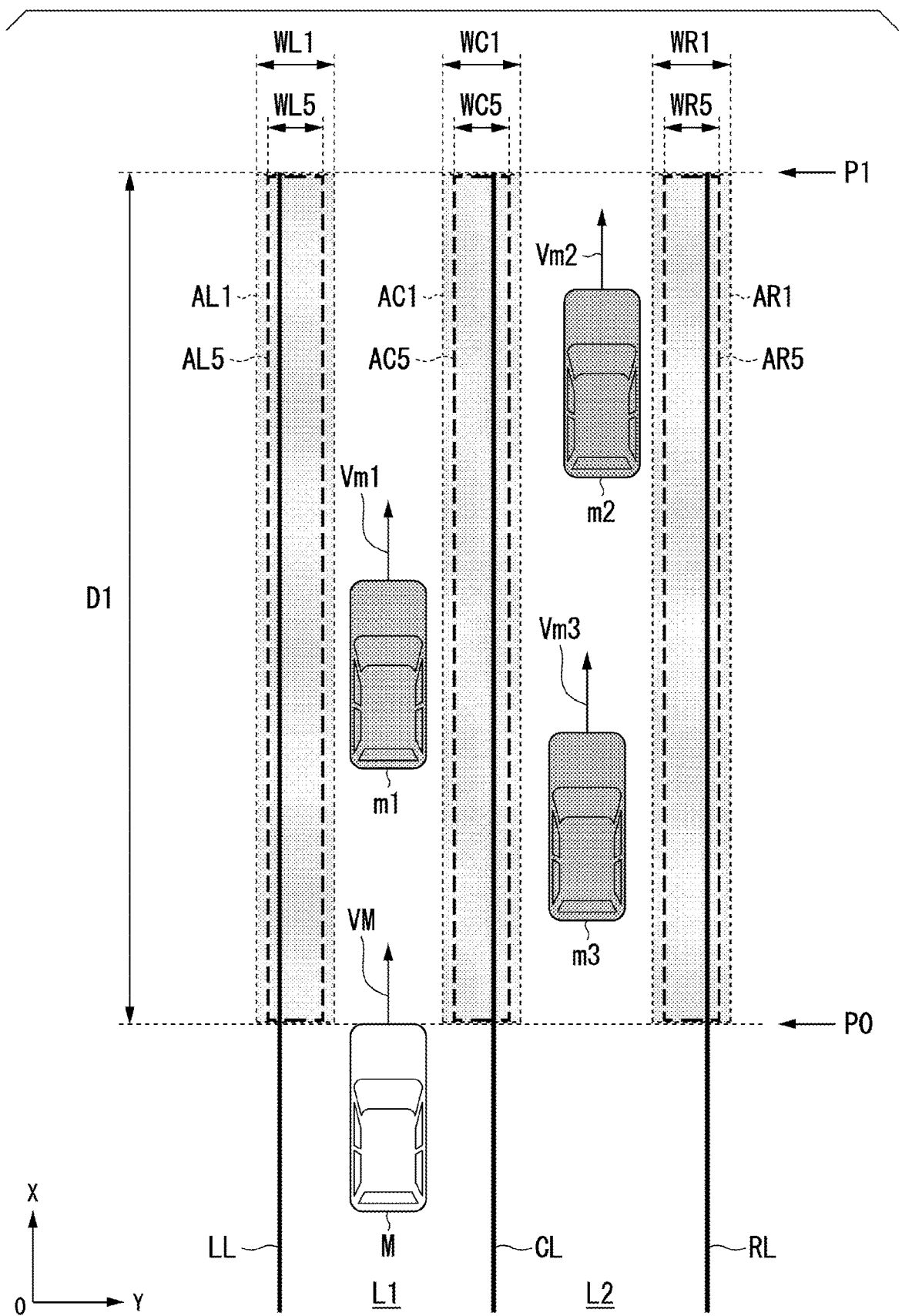
FIG. 5 is a diagram for describing a change pattern of the road boundary determination area when another vehicle is recognized.

In a fourth change pattern, the determiner 136 changes the road boundary determination area according to whether or not another vehicle near the host vehicle M has been recognized. FIG. 5 is a diagram for describing a change pattern of the road boundary determination area when another vehicle is recognized. In the example of FIG. 5, another vehicle m1 traveling in the same lane L1 as the host vehicle M at a speed Vm1, another vehicle m2 traveling in the lane L2 adjacent to the lane L1 at a speed Vm2, and another vehicle m3 traveling in the lane L2 at a speed Vm3 are in front of the host vehicle M. The number of other vehicles in the embodiment is not limited to the above. In the fourth change pattern, it is assumed that road boundary determination areas AL1, AC1, and AR1 associated with division lines LL, CL, and RL are road boundary determination areas when there is no other vehicle near the host vehicle M.

When another vehicle is in the vicinity of the host vehicle M, it may be difficult to recognize a road boundary present on the side further away than the other vehicle when viewed from the host vehicle M or difficult to recognize a road boundary shadowed by the other vehicle or there is a possibility that a boundary will be erroneously recognized according to a position of the other vehicle or a road shape. Therefore, the determiner 136 sets a narrow road boundary determination area when the recognizer 130 has recognized the other vehicle in the vicinity of the host vehicle M as compared with when the other vehicle has not been recognized.

In the example of FIG. 5, the recognizer 130 recognizes positions of the other vehicles m1 to m3 and directions, speeds, and the like thereof when viewed from the host vehicle M. The determiner 136 changes the road boundary determination area to a road boundary determination area AL5, AC5, or AR5 smaller than a road boundary determination area AL1, AC1, or AR1 when the recognition result of the recognizer 130 includes another vehicle traveling in front of the host vehicle M. For example, the determiner 136 sets the road boundary determination areas AL5, AC5, and AR5 smaller than the road boundary determination areas AL1, AC1, and AR1 by setting the widths WL1, WC1, and WR1 of the road boundary determination areas to the decreased widths WL5, WC5, and WR5.

The determiner 136 may adjust a size of the road boundary determination area on the basis of a position of another vehicle and a road shape. For example, when other vehicles m1 to m3 are present at the positions as shown in FIG. 5, an unrecognizable section of the division line RL is larger than that of the division line LL or CL when viewed from the host vehicle M. Therefore, the determiner 136 adjusts the width WR5 of the road boundary determination area AR5 so that the road boundary determination area AR5 is smaller than the road boundary determination areas AL5 and AC5. Although the lane L2 is an adjacent lane in which traveling is possible in the same direction as the lane L1 in the example of FIG. 5, the determiner 136 may change the road boundary determination area as described above even if the lane L2 is an oncoming lane opposite to the lane L1.

For example, because a determination condition can be strict when another vehicle (an adjacent vehicle or an oncoming vehicle) is present according to the above-described fourth change pattern, it is possible to restrict the driving control based on the recognition result from being started under a situation in which the accuracy of recognition of the boundary is low when the other vehicle is present in the vicinity of the host vehicle M.

<Fifth Change Pattern>

Figure 6:
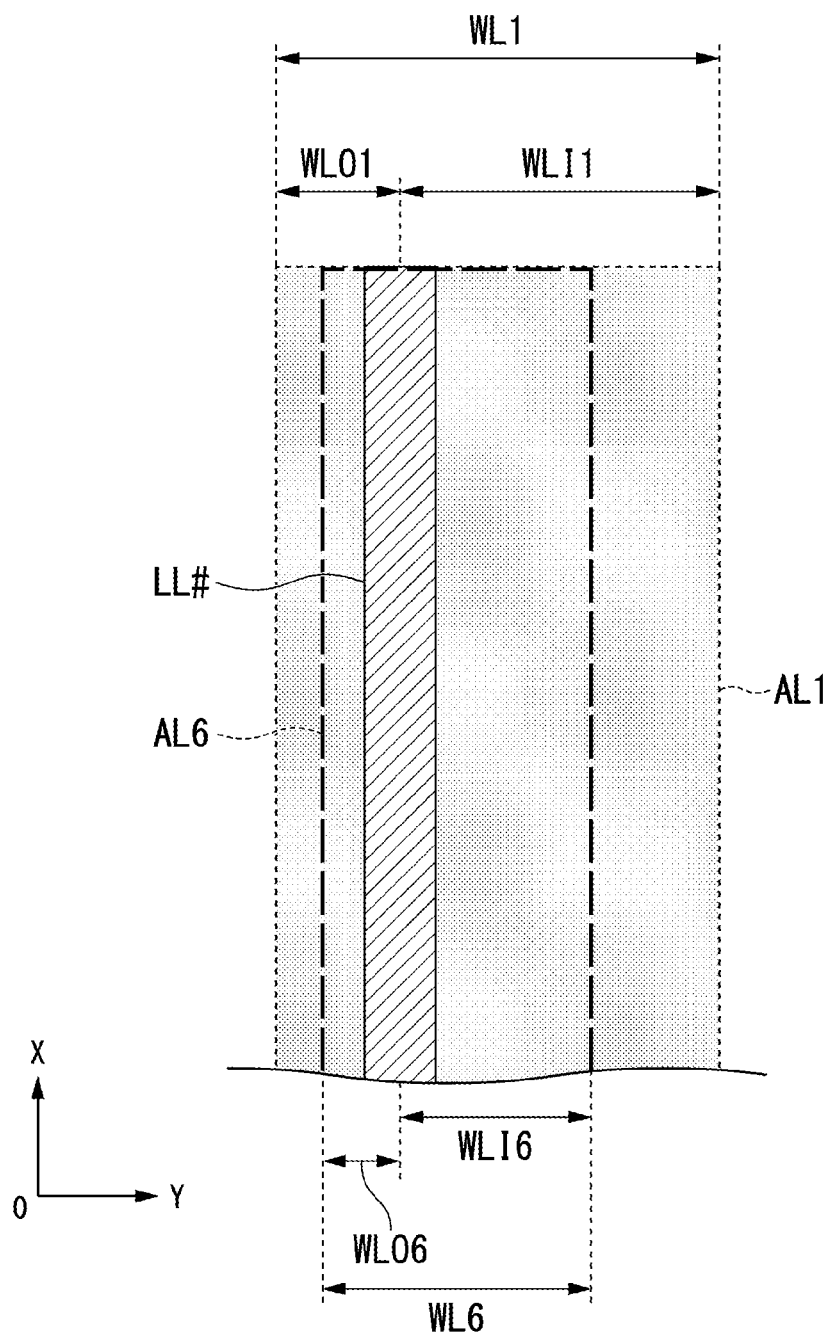
FIG. 6 is a diagram for describing a change pattern of the road boundary determination area when a structure is included in a road boundary.

In a fifth change pattern, the determiner 136 changes the road boundary determination area according to whether or not the road boundary includes a structure (a road structure) such as a guardrail, a curb, or a median strip. FIG. 6 is a diagram for describing a change pattern of a road boundary determination area when a structure is included in the road boundary. In the example of FIG. 6, a part of a division line LL # along which the host vehicle M travels is shown. The road information acquirer 132 acquires the road structure information including a surrounding road boundary based on position information of the host vehicle M with reference to the map information (the first map information 54 and second map information 62) on the basis of the position information of the host vehicle M. Because the map information includes a type of each road boundary, it is possible to acquire information about whether the boundary is a boundary through which the vehicle can pass such as a lane mark drawn on the road or a boundary through which the vehicle cannot pass such as a curb or a guardrail with reference to the map information. In the example of FIG. 6, it is assumed that the road division line LL # is a road boundary including a curb.

For example, when it is determined that the road division line LL # is an impassable division line including a curb according to the structure acquired by the road information acquirer 132, the determiner 136 sets a road boundary determination area smaller than the road boundary determination area set in the case of passable road structure information. In the example of FIG. 6, when the road boundary determination area in the case of a passable division line is the area AL1, the determiner 136 sets an area AL6 smaller than the area AL1 as the road boundary determination area. Specifically, when a change to the width WL6 smaller than the width WL1 of the road boundary determination area AL1 is made, the road boundary determination area AL6 smaller than the road boundary determination area AL1 is set. The width WL6 may have a width WLO6 smaller than the width WLO of the side further away than the division line according to the change when viewed from the host vehicle M, may have a width WLI6 smaller than the width WLI of the side nearer to the division line according to the change when viewed from the host vehicle M, or may have both the width WLO6 and the width WLI6 according to the change.

When it is determined that the road division line LL # is a passable division line according to the structure information acquired by the road information acquirer 132, the determiner 136 may set a road boundary determination area larger than the road boundary determination area set in the case of a division line including an impassable road structure. In the example of FIG. 6, when the road boundary determination area in the case of an impassable division line is the road boundary determination area AL6, the determiner 136 sets the road boundary determination area AL1 larger than the road boundary determination area AL6.

According to the above-described fifth change pattern, the determination of matching can be performed more appropriately in accordance with a type of road boundary. For example, it is possible to give priority to the accuracy of matching because the deviation of the host vehicle M from the lane is not allowed in the case of a road boundary through which the host vehicle M cannot pass and it is possible to facilitate the determination of matching because the deviation of the host vehicle M from the lane is allowed in the case of a road boundary through which the host vehicle M can pass.

<Modified Examples of Change Pattern>

Each of the above-described first to fifth change patterns may be combined with some or all of the other change patterns. In the above-described first to fifth change patterns, a change may be made in a step-by-step manner instead of changing the width of the road boundary determination area uniformly in an extension direction.

Figure 7:
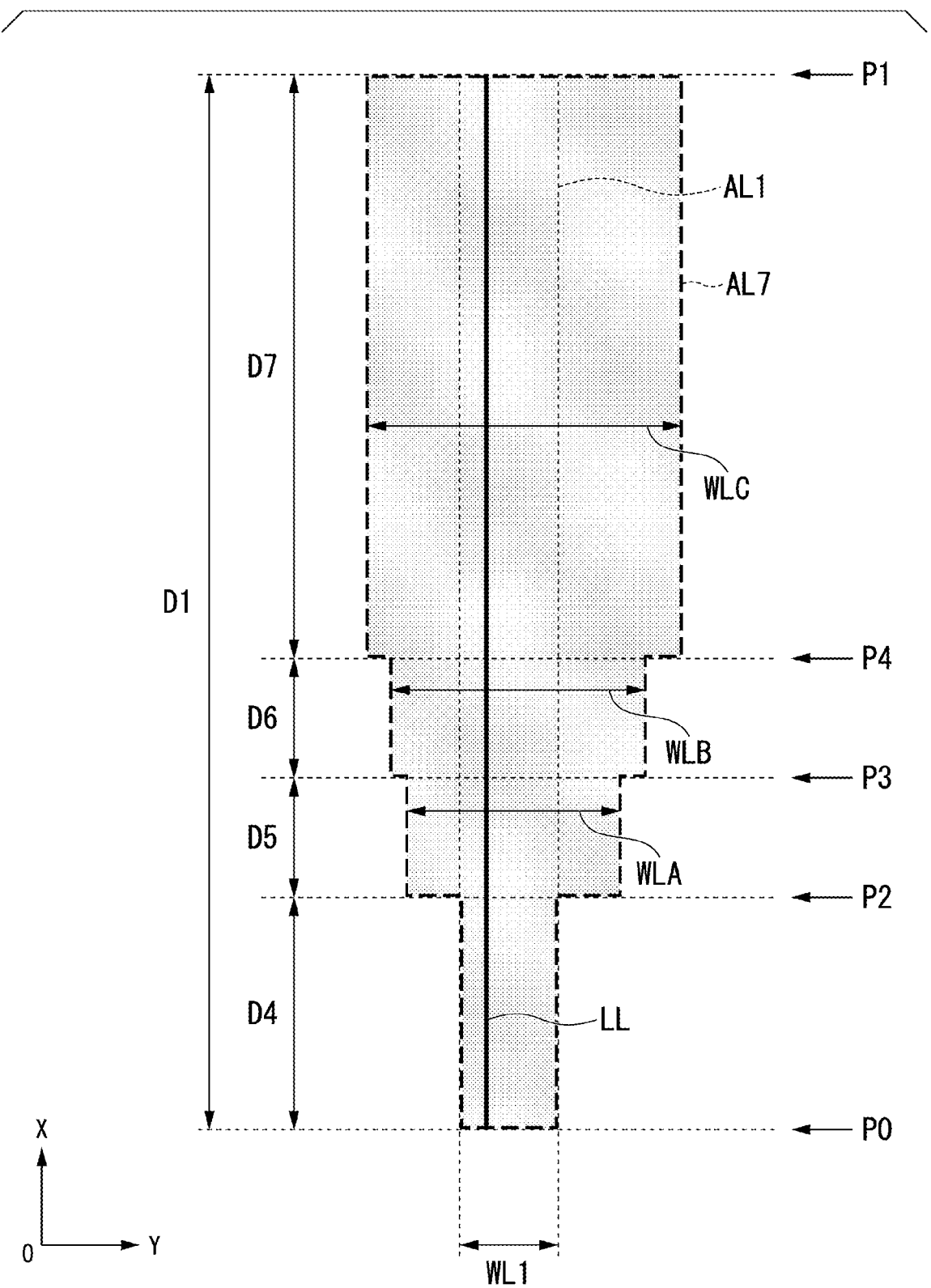
FIG. 7 is a diagram for describing a process of changing a width of the road boundary determination area in a step-by-step manner.

FIG. 7 is a diagram for describing a process of changing the width of the road boundary determination area in a step-by-step manner. When a road boundary determination area AL1 is increased, the determiner 136 sets a road boundary determination area AL7 by increasing the width WL of the road boundary determination area from the width WL1 in a step-by-step manner. In the example of FIG. 7, the determiner 136 sets the width WL1 in a section D4 from a reference point P0 to a point P2 that is a predetermined distance forward from the reference point P0 within a section from the reference point P0 to a point P1 in the forward direction (the traveling direction) and sets a width WLA larger than the width WL1 in a second D5 from the point P2 to a point P3. Further, the determiner 136 sets a width WLB larger than the width WLA in a section D6 from the point P3 to a point P4 and sets a width WLC larger than the width WLA in a section D7 from the point P4 to the point P1. The lengths of the sections D4 to D7 may be variably changed on the basis of the vehicle speed of the host vehicle M and the road shape or may be variably set according to a condition in which the road boundary determination area is changed (for example, the change pattern). If the width of the road boundary determination area is excessively narrow, it is difficult to perform the determination of matching, so that it is difficult to perform control of automated driving or the like. In contrast, if the width of the road boundary determination area is excessively wide, the road boundary is likely to be erroneously recognized. Thus, the determiner 136 can execute more appropriate driving control on the basis of a determination result by setting a maximum value and a minimum value of the width and performing adjustment so that there is no unnecessary change.

Figure 8:
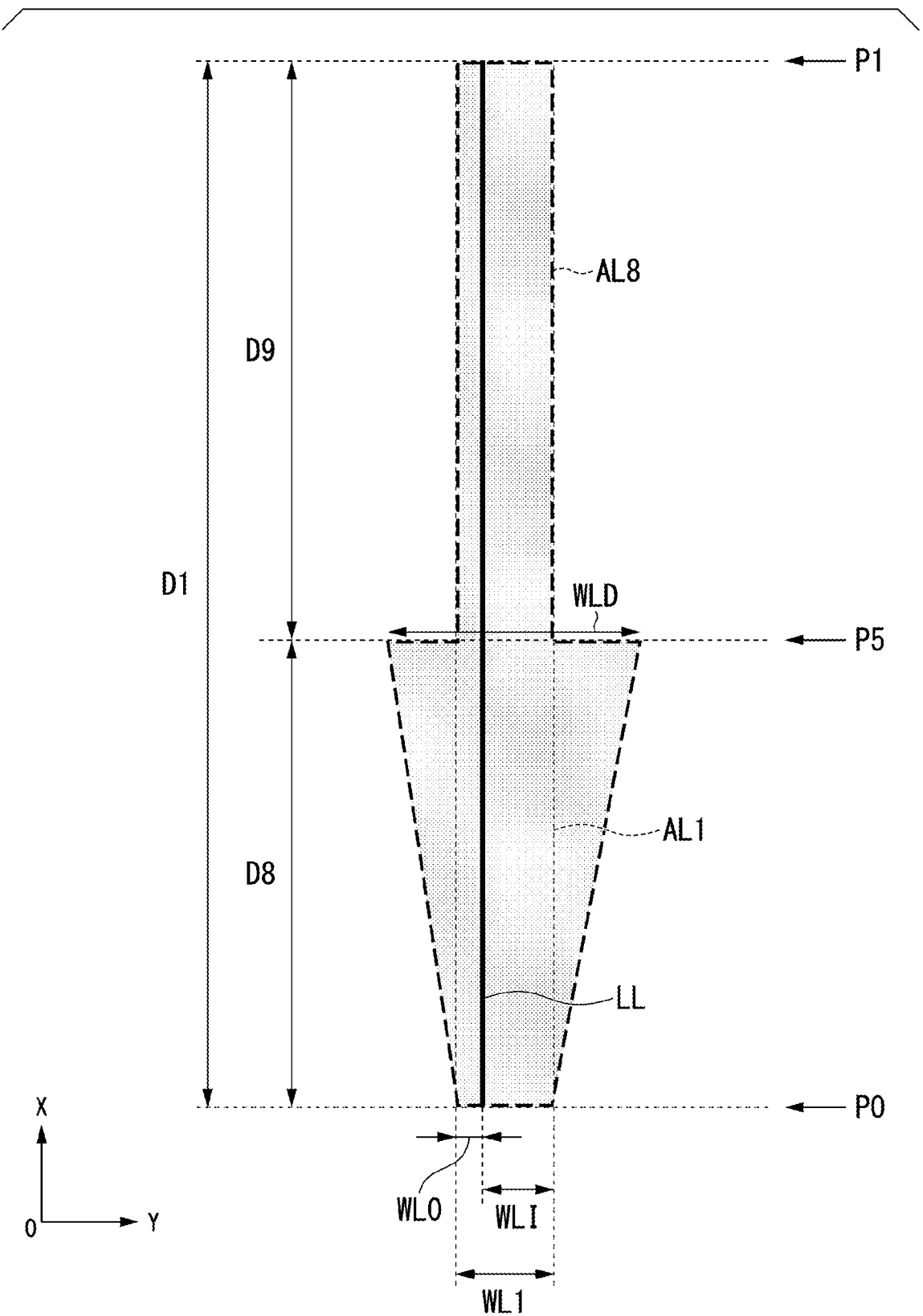
FIG. 8 is a diagram for describing a process of increasing the width of the road boundary determination area in accordance with a distance from a host vehicle.

The determiner 136 may increase the width in accordance with a distance from the host vehicle M instead of increasing the width in a step-by-step manner as described above. FIG. 8 is a diagram for describing a process of increasing a width of a road boundary determination area in accordance with a distance from the host vehicle M. When a road boundary determination area set in a section D1 from a reference point P0 to a point P1 is increased, the determiner 136 can increase the entire road boundary determination area AL8 by linearly increasing the width from a width WL1 to a width WLD in accordance with a length of a distance from the point P0 (in other words, the position of the host vehicle M) in a section D8 from the reference point P0 to a point P5. Because the road boundary is likely to be erroneously recognized if the width is excessively wide, the determiner 136 may adjust the width so that the width is not greater than or equal to a predetermined width. In the example of FIG. 8, a width of the road boundary determination area in the section from the point P5 to the point P1 is set to WL1.

When the road boundary determination area is decreased, the determiner 136 may linearly narrow the width of an area in accordance with a distance from a point in front of the host vehicle M in a predetermined section. Thereby, the road boundary determination area can be changed more flexibly in accordance with a surrounding condition of the host vehicle M, a road state, and the like.

[Processing Flow]

Figure 9:
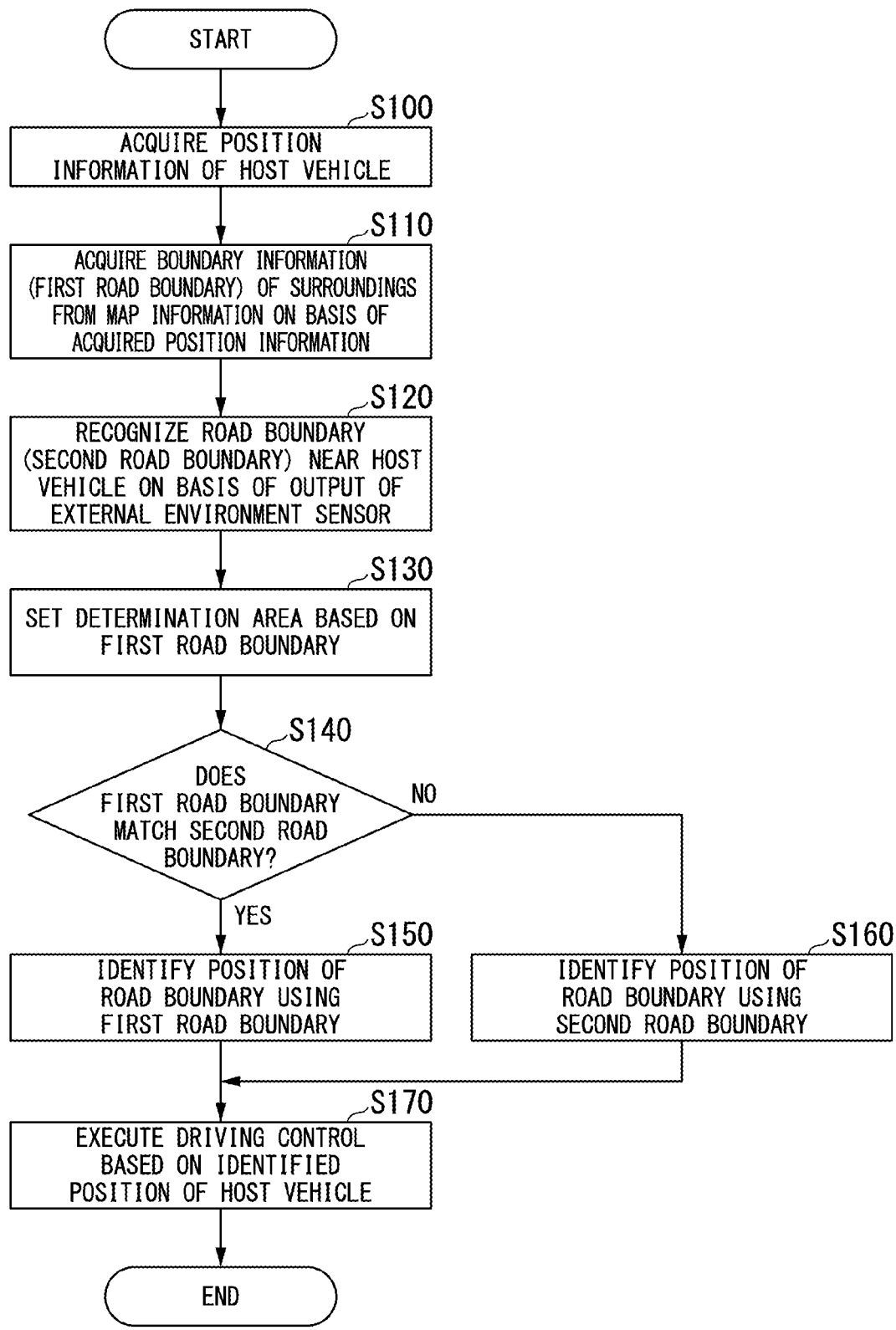
FIG. 9 is a flowchart showing an example of a flow of a process executed by an automated operation control device including a surroundings recognition device of the embodiment.

FIG. 9 is a flowchart showing an example of a flow of a process executed by the automated driving controller 100 including the surroundings recognition device of the embodiment. The process shown in FIG. 9 is iteratively executed at a predetermined timing or a predetermined interval. For example, the process shown in FIG. 9 is iteratively executed while the automated driving by the automated driving controller 100 is being executed.

In the process of FIG. 9, the road information acquirer 132 acquires position information of the host vehicle M from the vehicle sensor 40 (step S100). Next, the road information acquirer 132 acquires boundary information (a first road boundary) near the host vehicle from the map information on the basis of the acquired position information (step S110). Next, the road boundary recognizer 134 recognizes a road environment (a second road boundary) near the host vehicle M on the basis of an output of the external environment sensor (step S120).

Next, the determiner 136 sets a road boundary determination area based on the first road boundary (step S130). Next, the determiner 136 determines whether or not the first road boundary matches the second road boundary (step S140). When it is determined that the first road boundary matches the second road boundary, the determiner 136 identifies the position of the host vehicle M using the first road boundary (step S150). When it is determined that the first road boundary does not match the second road boundary, the determiner 136 identifies the position of the road boundary using the second road boundary (step S160). After the processing of steps S150 and S160, the automated driving controller 100 executes the driving control on the basis of the position of the road boundary identified by the determiner 136 (step S170). The processing of step S170 may include some or all of the processes of the action plan generator 140 and the second controller 160 based on the recognition result of the recognizer 130. Thereby, the process of the present flowchart ends.

According to the above-described embodiment, a surroundings recognition device includes the road information acquirer 132 configured to acquire first road information including a road boundary near the host vehicle M from map information on the basis of position information of the host vehicle M; the road boundary recognizer 134 configured to recognize a road boundary near the host vehicle M on the basis of an output of the external environment sensor; and the determiner 136 configured to determine that a first road boundary matches a second road boundary when the second road boundary included in second road information that is a recognition result of the road boundary recognizer 134 is within a road boundary determination area based on a position of the first road boundary included in the first road information acquired by the road information acquirer 132, wherein the determiner 136 sets a size of the road boundary determination area on the basis of a predetermined condition, so that it is possible to improve the accuracy of recognition of surroundings of the vehicle. According to the present embodiment, it is possible to appropriately perform the determination of matching by appropriately changing a determination condition in the determination of whether or not the information of the external environment sensor matches the map information. Because the condition for boundary determination can be adjusted, it is possible to improve the accuracy of recognition of the position of the host vehicle M with respect to the road on the basis of the recognition result and it is possible to execute more appropriate automated driving control based on the recognition result.

[Modified Examples]

In the above-described embodiment, a road shape such as a bridge, a tunnel, or an intersection included in the road information may be recognized instead of (or in addition to) recognition of a road boundary near the host vehicle M. Also, the road boundary determination area described above may include not only an area forward from the host vehicle M but also an area on a side of the host vehicle M or an area rearward from the host vehicle M.

[Hardware Configuration]

Figure 10:
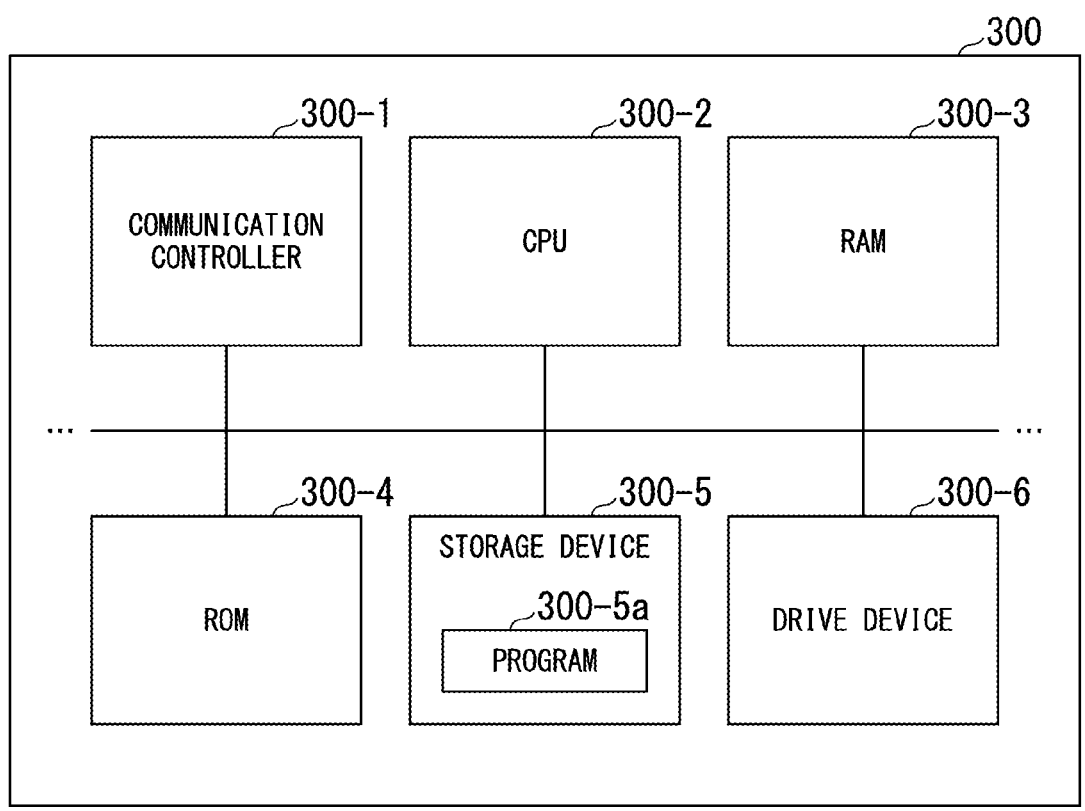
FIG. 10 is a diagram showing an example of a hardware configuration of the surroundings recognition device of the embodiment.

FIG. 10 is a diagram showing an example of a hardware configuration of the surroundings recognition device according to the embodiment. As shown in FIG. 10, a computer of the surroundings recognition device 300 has a configuration in which a communication controller 300-1, a CPU 300-2, a RAM 300-3 used as a working memory, a ROM 300-4 storing a boot program and the like, a storage device 300-5 such as a flash memory or an HDD, a drive device 300-6, and the like are mutually connected by an internal bus or a dedicated communication line. The communication controller 300-1 communicates with components other than the surroundings recognition device 300. A portable storage medium (for example, a computer-readable non-transitory storage medium) such as an optical disc is mounted in the drive device 300-6. The storage device 300-5 stores a program 300-5a to be executed by the CPU 300-2. This program is loaded into the RAM 300-3 by a direct memory access (DMA) controller (not shown) or the like and executed by the CPU 300-2. The program 300-5a to be referred to by the CPU 300-2 may be stored in a portable storage medium mounted in the drive device 300-6 or may be downloaded from another device via a network. Thereby, some or all of components of the surroundings recognition device are implemented.

The above-described embodiment can be implemented as follows.

A surroundings recognition device including:

a storage device storing a program; and a hardware processor, wherein the hardware processor executes the program stored in the storage device to:

acquire first road information including a road boundary near a host vehicle from map information on the basis of position information of the host vehicle;

recognize a road boundary near the host vehicle on the basis of an output of an external environment sensor;

determine that a first road boundary matches a second road boundary when the second road boundary included in second road information that is a recognition result is within a road boundary determination area based on a position of the first road boundary included in the acquired first road information; and set a size of the road boundary determination area on the basis of a predetermined condition.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A surroundings recognition device comprising:
an acquirer configured to acquire first road information including a road boundary near a host vehicle from map information on the basis of position information of the host vehicle;
a recognizer configured to recognize a road boundary near the host vehicle on the basis of an output of an external environment sensor; and
a determiner configured to determine that a first road boundary matches a second road boundary when the second road boundary included in second road information that is a recognition result of the recognizer is within a road boundary determination area based on a position of the first road boundary included in the first road information acquired by the acquirer,
wherein the determiner sets a size of the road boundary determination area on the basis of a predetermined condition,
wherein the road boundary determination area is an area having a predetermined width in a direction orthogonal to a longitudinal direction of the first road boundary on the basis of a position of the first road boundary, and
wherein an area of a side further away than the first road boundary is smaller than an area of a side nearer to the first road boundary when viewed from the host vehicle.

2. The surroundings recognition device according to claim 1, further comprising a position measurer configured to measure a position of the host vehicle,
wherein the determiner sets a size of the road boundary determination area on the basis of accuracy of the position of the host vehicle measured by the position measurer.

3. The surroundings recognition device according to claim 1, wherein the determiner sets the size of the road boundary determination area on the basis of an elapsed period from a date on which the map information has been created or updated.

4. The surroundings recognition device according to claim 1, wherein the determiner increases a width of the road boundary determination area on the basis of a speed of the host vehicle.

5. The surroundings recognition device according to claim 1, wherein the determiner decreases the road boundary determination area when the recognizer has recognized another vehicle near the host vehicle as compared with when no other vehicles have been recognized.

6. The surroundings recognition device according to claim 1, wherein the determiner performs a plurality of determinations of whether or not the first road boundary matches the second road boundary, determines that the first road boundary matches the second road boundary when a matching count is greater than or equal to a predetermined number, and resets the matching count when the map information has been updated.

7. The surroundings recognition device according to claim 1, wherein the determiner decreases the road boundary determination area when the first road boundary includes a structure as compared with when the first road boundary does not include the structure.

8. A surroundings recognition method comprising:
acquiring, by a computer, first road information including a road boundary near a host vehicle from map information on the basis of position information of the host vehicle;
recognizing, by the computer, a road boundary near the host vehicle on the basis of an output of an external environment sensor;
determining, by the computer, that a first road boundary matches a second road boundary when the second road boundary included in second road information that is a recognition result is within a road boundary determination area based on a position of the first road boundary included in the acquired first road information; and
setting, by the computer, a size of the road boundary determination area on the basis of a predetermined condition,
wherein the road boundary determination area is an area having a predetermined width in a direction orthogonal to a longitudinal direction of the first road boundary on the basis of a position of the first road boundary, and
wherein an area of a side further away than the first road boundary is smaller than an area of a side nearer to the first road boundary when viewed from the host vehicle.

9. A surroundings recognition device comprising:
an acquirer configured to acquire first road information including a road boundary near a host vehicle from map information on the basis of position information of the host vehicle;

a recognizer configured to recognize a road boundary near the host vehicle on the basis of an output of an external environment sensor; and a determiner configured to determine that a first road boundary matches a second road boundary when the second road boundary included in second road information that is a recognition result of the recognizer is within a road boundary determination area based on a position of the first road boundary included in the first road information acquired by the acquirer, wherein the determiner sets a size of the road boundary determination area on the basis of a predetermined condition, wherein the determiner calculates a proportion of the second road boundary included in a predetermined section within the road boundary determination area and determines that the first road boundary matches the second road boundary when the calculated proportion is greater than or equal to a threshold value, and wherein a weight for the proportion is made larger when a road boundary of a first area nearer to the host vehicle within the second road boundary is within the road boundary determination area than when a road boundary of a second area further away from the host vehicle than the first area is within the road boundary determination area when viewed from the host vehicle.

10. A surroundings recognition method comprising:

acquiring, by a computer, first road information including a road boundary near a host vehicle from map information on the basis of position information of the host vehicle;

recognizing, by the computer, a road boundary near the host vehicle on the basis of an output of an external environment sensor;

determining, by the computer, that a first road boundary matches a second road boundary when the second road boundary included in second road information that is a recognition result is within a road boundary determination area based on a position of the first road boundary included in the acquired first road information;

setting, by the computer, a size of the road boundary determination area on the basis of a predetermined condition;

calculating, by the computer, a proportion of the second road boundary included in a predetermined section within the road boundary determination area; and determining, by the computer, the first road boundary matches the second road boundary when the calculated proportion is greater than or equal to a threshold value, wherein a weight for the proportion is made larger when a road boundary of a first area nearer to the host vehicle within the second road boundary is within the road boundary determination area than when a road boundary of a second area further away from the host vehicle than the first area is within the road boundary determination area when viewed from the host vehicle.

* * * * *